Dec. 17, 1935.  J. W. RACKLYEFT  2,024,947
CLUTCH MECHANISM
Filed May 10, 1933
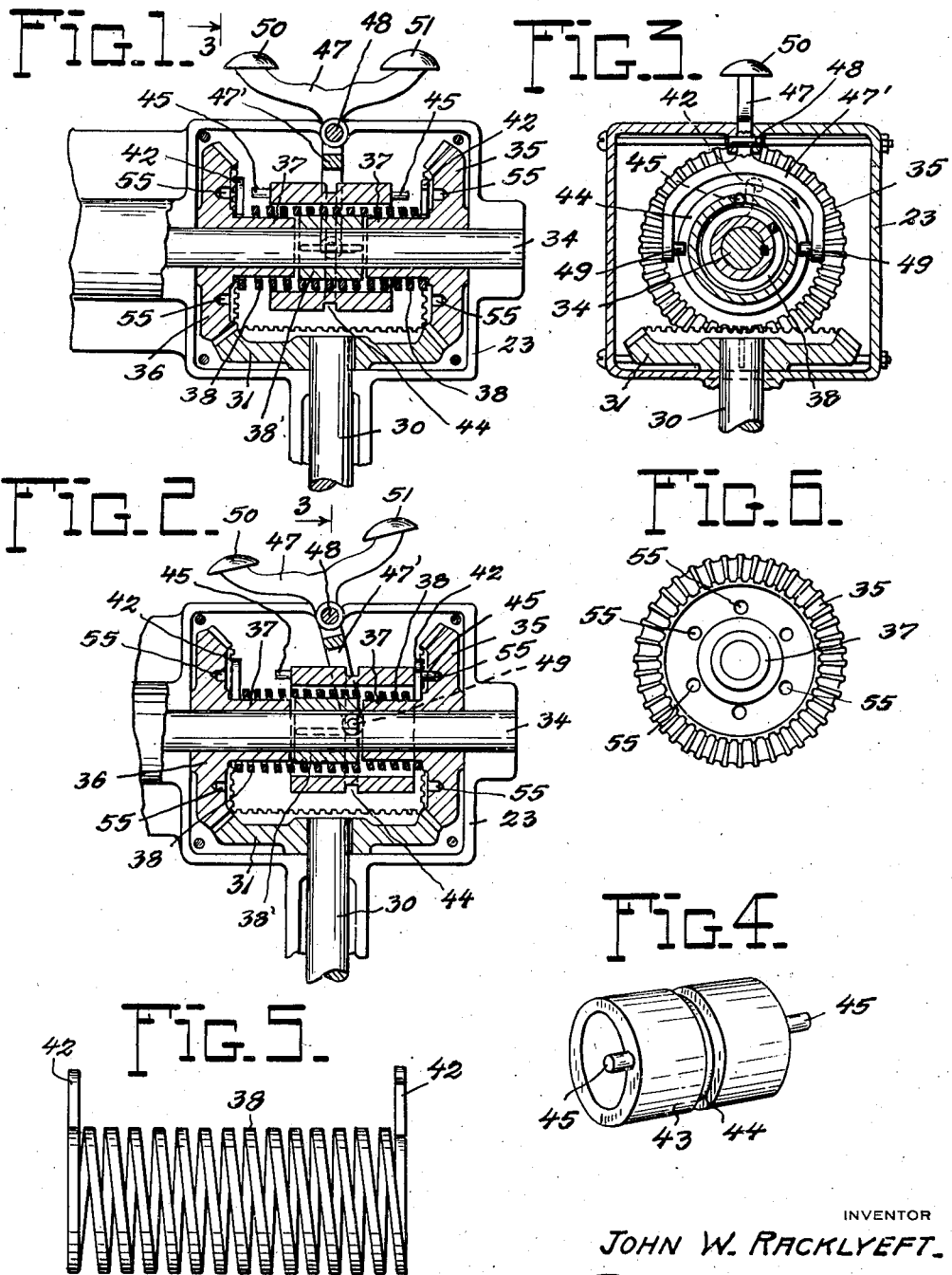
INVENTOR
JOHN W. RACKLYEFT
BY
ATTORNEYS Patented Dec. 17, 1935

2,024,947

UNITED STATES PATENT OFFICE 2,024,947

CLUTCH MECHANISM

John W. Racklyeft, Cleveland, Ohio

Application May 10, 1933, Serial No. 670,383

14 Claims. (Cl. 192—21)

This invention relates to a clutch mechanism for transmitting motion and to instrumentalities for manually controlling the operation of the same.

The aim of this invention is to provide a smooth acting clutch mechanism, especially adapted for use with washing machines that is quick and positive in operation and may be used successfully for clutching various units with the source of power without subjecting the power transmission system to sudden loads when engaged, or slipping or releasing under load. By virtue of the novel clutching mechanism, the control of various units of the machine may be simplified and made more convenient and accessible to the operator which raises the safety factor and adds to the desirability of the machine.

In present day washing machines, various units as for instance the wringer, or the like, are driven from a central source of power, each served by a clutching device, which may vary widely in design and operation over the clutching devices for the other units. Ordinarily these clutches are of a very elementary nature and operate in the crudest fashion, subjecting the operating parts of the machine to sudden loads and consequent wear. On the other hand, the devices are not positive in operation, often releasing under load, slipping, or being difficult to engage. All of this detracts from the efficiency and desirability of the machine and belies any assertion that the machine is smooth acting and easy to operate.

An undesirable feature that arises from the use of several types of clutch on one machine lies in the fact that there is no similarity of movement between various control levers, each of which operates in a manner best suited to shift the parts, which often leads to confusion that might result in the loss of a split second which would spell the difference between catastrophe and a minor accident. On the other hand, it is not always possible to locate these control levers to the best advantage, where they will be readily accessible to the operator, which is traceable directly, I believe, to the design of the clutching mechanism.

This invention contemplates the provision of a novel spring clutch mechanism, wherein clutching action is obtained by utilizing the force applied at one end of a helical coil spring, as opposed by the inertia load at the other end of the spring to produce a contraction of the winds of the spring in a radial direction about parts associated with the driving and driven elements, whereby the driven element may be rotated through the spring without danger of the spring slipping. In other words, the greater the load on the spring, the greater the wrapping effect. To release the parts, the coils of the spring, over at least a part of its length, are caused to be expanded in a radial direction, either by applied force or by the resiliency inherent in the spring per se. This extremely simple mechanism, made up of a minimum of working parts, is ideally suited to serve various units of a washing machine in a positive and efficient manner.

As an advantage arising out of the use of this novel clutching mechanism, I have found it possible to place the control of a washing machine at the operator's fingertips. In fact, the controls may be arranged so that each will be accessible to the operator for manual operation from the position which he would usually take at the machine. Furthermore, each control may be given an identity of movement common to all the controls that will be distinctive and easily fixed in the operator's mind, thus avoiding confusion. Specifically, it is my intention to produce the coupling or uncoupling of any one of the clutch mechanisms by simply striking downward with the palm or in other words moving the hand in a direction normal to the surface on which the machine is resting and into engagement with a button which may be palmed and pressed down, all of which will be referred to hereinafter in more detail.

Other objects and advantageous features of this invention will be noted in the following detailed description and accompanying drawing, wherein like characters of reference indicate like parts, wherein—

Figure 1 is a vertical longitudinal section through my novel clutch mechanism designed to operate the wringer rolls on a conventional type of washing machine.

Figure 2 is a sectional view of the mechanism shown in Figure 1 illustrating the parts in one position of adjustment.

Figure 3 is a section taken on line 3—3 of Figure 1.

Figure 4 is a detail in perspective of the shift sleeve employed with the clutch mechanism of Figures 1, 2 and 3.

Figure 5 is a detail of the coil spring employed with the clutch mechanism of Figures 1, 2 and 3.

Figure 6 is a front elevation of one of the wringer shaft gears showing the arrangement and location of a plurality of holes for receiving a stud carried by the sleeve of Figure 4.

In Figures 1 to 6 inclusive, I have shown the novel clutching mechanism by virtue of which I may selectively clutch the pressure rolls of the wringer or the like of a washing machine to the source of power. The wringer rolls are adapted to be driven in a forward or reverse direction so that clothes, or other articles, may be fed directly into the agitator tub of the machine or from said compartment into a wall tub. Accordingly, my novel clutching mechanism is designed to clutch a forward gear or a reversing gear to the pressure roll shaft so that force may be transmitted positively thereto, without danger of releasing under load or subjecting the parts to sudden loads when engaged.

The gearing just mentioned is disposed in a split housing 23, Figure 1, and is operated from a main shaft 30 to which a bevel gear 31 is keyed that in turn meshes with the forward bevel gear 36 and the reverse bevel gear 35, both mounted for rotation on the main roll shaft 34. To accommodate the helical coil spring 38, each gear 35 and 36 is provided with a hub portion 37 both of the same diameter and disposed in end to end relation, as shown. Intermediate the opposing ends of the hubs is a sleeve 38' keyed to the shaft 34 and of slightly greater diameter than either of the hubs 37, for a purpose to be hereinafter referred to.

The coil spring is best shown in Figure 5, wherein it is disclosed as being made up of a plurality of spaced convolutions, the end portions being turned upwardly and over to provide abutments 42 for engaging with a stud to be hereinafter referred to. With reference to Figure 1, it will be observed that the spring encompasses the hubs 37 as well as the sleeve 38' of larger diameter, and that the convolutions thereof in the mid-portion tightly embrace the sleeve 38', while the convolutions at the ends of the spring are held out of contact with the hubs 37 when the mechanism is in what I choose to term "neutral".

To clutch the spring to either of the hubs 37, I provide a novel arrangement which takes the form of a movable member 43, Figure 4, which encompasses the spring 38 in the manner shown in Figure 1 and is slidable axially therealong by means of a rockable control handle 47 having a yoke 47' and inwardly turned lugs 49 adapted to lie in a circumferential groove 44, Figure 4, of the movable member. The movable member 43 is further equipped with what I choose to term "studs" 45, that are adapted to engage with any one of a plurality of holes 55 that are circumferentially arranged, as shown, in the opposed radial faces of the gears 35 and 36.

To operate the clutching mechanism to transmit motion from the shaft 30 to the wringer shaft 34, the movable member 43 is urged either to the right or to the left by the control handle, to be hereinafter referred to more in detail, to engage one of the studs 45 with one of the openings 55 in its complemental gear 35 or 36. The movable member is then rotated with the respective gear about the axis of the shaft and engages one of the ends 42 of the spring as illustrated in Figures 2 and 3, whereupon a force is applied to the spring end in the direction of its winds to cause a wrapping effect and a gripping as shown in Figure 2, of one of the hubs 37, resistance to rotation being offered by the load taken at the mid-section of the spring. In this instance, the drive is taken through the spring which is caused to contract in one zone to grip a rotating part and by virtue of this gripping action to receive and transmit power to a driven element which, in this case, is the sleeve 38' mounted for rotation with the shaft 34. The couple may be broken by simply shifting the movable member to "neutral" position, thereby releasing the spring end 42, whereupon the spring expands through its inherent resiliency in a radial direction, thus releasing the hub 37.

Consistent with my thought of providing an identity of movement for the manual control means, the control is fashioned to afford a dual handle arrangement 47 as shown in Figure 1, rockable about a transverse axis under the influence of a downward pressure. The terminal portions of the handle are hemispherical as shown at 50 and 51, for the purpose hereinbefore mentioned. The device is pivoted in the split housing as at 48, so that the yoke may be shifted in either direction by merely bringing the palm of the hand into engagement with the desired button or head 50 and 51. This means that in case of an accident and it is impossible to reach the "safety", the operator can, with one simple quick movement, namely that of striking down with the hand, stop and then reverse the pressure rolls if necessary.

Although I have shown and described my novel clutch mechanism as being employed with a power washing machine, I do not care to limit the utility of the clutch to this field since it may be used in other and further capacities if so desired.

Having thus described my invention, what I claim as new and desire to secure by Letters Patent of the United States, is:

1. In a clutching mechanism for connecting a driving gear to a shaft and by virtue of such connection to obtain rotation of said shaft, the combination of a shaft, a driven element mounted for rotation with said shaft, a coil spring encompassing said element and normally having its convolutions held out of engagement with said gear, means for rotating said coil spring with said gear, comprising a movable part encompassing said coil spring and slidable thereon, means for connecting said movable part to said gear to be rotated thereby and for engaging said spring to rotate the same when said movable part is rotated and to cause said spring to contract radially and rotate with said gear, and means for shifting said movable part axially with respect to said spring.

2. In a clutching mechanism for connecting a driving gear, having a hub, to a shaft and by virtue of such connection to obtain rotation of said shaft, the combination of a shaft, a driven element mounted for rotation with said shaft, a coil spring encompassing said element and normally having its convolutions held out of engagement with the hub of said gear, means for rotating said coil spring with said gear, comprising a movable part encompassing said coil spring and slidable thereon, means for connecting said movable part to said gear to be rotated thereby, means associated with said movable part for engaging a portion of said spring to rotate the same when said movable part is rotated to cause said spring to contract radially around the gear hub, and means for shifting said movable part axially with respect to said spring, said means comprising a rocking lever having a part engaging the movable part and a dual handle.

3. Means for connecting a driving gear, having a hub, to a shaft for driving said shaft with said gear, which comprises a driven part mounted on said shaft and rotatable therewith, a coil spring surrounding and gripping said driven part and encompassing the hub of said gear, means for causing the convolutions of said spring to contract and grip said hub, comprising a shiftable part reciprocable on said spring, a stud on said last named shiftable part for engaging said gear whereby said part is rotated, means associated with said spring and engageable by said stud for rotating said spring and causing the same to grip said hub, and a rocking lever for moving said shiftable part.

4. In a clutch, in combination, a driving member, a driven member, a clutch spring intermediate said driving and driven members and normally free in respect to the driving member, a movable part associated with the driving member and encompassing said clutch spring, an instrumentality for shifting said movable part, coupling means carried by said movable part and engageable with said spring and driving member to contract said spring into engagement with the driving member to be rotated thereby, the driven member being so engaged with said spring that upon rotation of the spring by the driving member the spring will be contracted into clutch engagement with the driving member and thereby clutched to the driving member.

5. In combination a driving shaft, a driven shaft, a clutching mechanism for selectively coupling said driving shaft, with said driven shaft, comprising driving members having coaxial hub portions, a sleeve mounted on said driven shaft and lying between the ends of the hub portions, a coil spring encompassing said sleeve and the hub portions aforesaid and having the convolutions thereof gripping said sleeve while normally free from the hub portions, and means for applying a twisting moment to either end of said coil spring to cause the same to contract and engage the hub portion of one of the driving members for clutching cooperation with the latter.

6. In combination a driving shaft, a driven shaft, a clutching mechanism for selectively coupling said driving shaft with said driven shaft, which comprises a pair of driven gears mounted on said driven shaft, the said gears having coaxial hub portions, a sleeve mounted on said shaft and lying between the ends of said hub portions, a coil spring encompassing the said sleeve and hub portions and having the convolutions thereof gripping said sleeve, means for applying a twisting moment to either end of said coil spring to cause the same to contract and engage the hub portion of one of the gears, and means for releasing the coil spring from engagement with said hub portion.

7. A reversing clutch mechanism including a source of power, a driven element, reverse driving gears associated with the driven element for transmitting reverse driving effects to the latter, a clutch spring intermediate each driving gear and the driven element and affixed to the latter, and instrumentalities for connecting either driving gear to its cooperating clutch spring, including a member adapted to be interengaged with either driving gear to be actuated thereby and coacting with its clutch spring when actuated by said driving gear to cause driving engagement of the clutch spring with the driving gear.

8. A reversing clutch mechanism including a source of power, a driven element, reverse driving gears associated with the driven element for transmitting reverse driving effects to the latter, a clutch spring intermediate each driving gear and the driven element and affixed to the latter, and instrumentalities for connecting either driving gear to its cooperating clutch spring, including a floating member intermediate and common to the driving gears, adapted to be interengaged with either driving gear to be actuated thereby and coacting with the clutch spring when actuated by said driving gear to cause driving engagement of the clutch spring with the driving gear.

9. A clutch mechanism including a driven element, driving gears associated therewith, a clutch spring intermediate each driving gear and the driven element and fixed to the driven element, an instrumentality common to the said driving gears and the said clutch spring, and means for operating said instrumentality whereby to connect it to either driving gear to be actuated thereby, and whereby to engage said instrumentality with the clutch spring at the time it is actuated by the driving gear to cause clutching engagement of such clutch spring with the driving gear to operatively drive the driven element.

10. A reversing clutch mechanism including a driven element, reverse driving gears associated therewith, a clutch spring intermediate each driving gear and the driven element, and an instrumentality common to the said driving gears and the said clutch spring, together with means for operating said instrumentality whereby to connect it to either driving gear to be actuated thereby and to coact with said spring to cause clutching operation of the latter with the driving gear.

11. In clutch mechanism, in combination, a driven element, a driving member cooperative for actuation of the driven element, and clutching means between said parts including a clutch spring attached to the driven element and arranged for clutching engagement with the driving member, and a normally stationary instrumentality associated with the driving member to engage with the latter so as to be operated thereby, said instrumentality having means normally out of engagement with the driving member and clutch spring for operating the clutch spring when said means are in engagement with the driving member, so as to cause clutching engagement of the clutch spring with the driving member at such time.

12. In a clutch, in combination, a driving member, a driven member, a clutch spring intermediate said driving and driven members and normally free in respect to the driving member, a movable part associated with the driving member and encompassing said clutch spring, an instrumentality for shifting said movable part, coupling means carried by said movable part engageable with said spring and driving member, the coupling means serving to transmit the driving force to said spring until the spring contracts to an extent sufficient to offer resistance to further contraction resulting in transmission from driving force to the driven member.

13. In a clutch, in combination, a driving member, a driven member, a clutch spring intermediate said driving and driven members and normally free in respect to the driving member, a movable part exterior of said clutch spring and associated with the driving member, coupling means carried by said movable part normally out of engagement with said spring, an instrumentality for shifting said movable part and coupling means for engaging said spring and driving member to contract said spring into engagement with the driving member to be rotated thereby, the driven member being so engaged with said spring that upon rotation of the spring by the driving member the spring will be contracted into clutch engagement with the driving member and thereby clutched to the driving member.

14. In a clutch, in combination, a driving member, a driven member, a clutch spring intermediate said driving and driven members and normally free in respect to the driving member, a movable part associated with the driving member and encompassing said clutch spring, an instrumentality for shifting said movable part into rotative connection with the driving member, means carried by said movable part normally out of engagement with said spring for engaging said spring when said movable part is connected with the driving member to contract said spring into engagement with the driving member to be rotated thereby, the driven member being so engaged with said spring that upon rotation of the spring by the driving member the spring will be contracted into clutch engagement with the driving member and thereby clutched to the driving member.

JOHN W. RACKLYEFT.